United States Patent

Inoshita et al.

[11] 4,037,522
[45] July 26, 1977

[54] VEHICLE AIR CONDITIONING COMPRESSOR

[75] Inventors: Teruaki Inoshita; Takashi Fukuda; Hitoshi Toga, all of Toyota; Hikaru Takaoka, Kariya, all of Japan

[73] Assignees: Taihou Kogyo Kabushiki Kaisha; Kabushiki Kaisha Toyoda Jidoshokki Seisakusho, both of Japan

[21] Appl. No.: 615,888

[22] Filed: Sept. 23, 1975

[30] Foreign Application Priority Data

Sept. 24, 1974 Japan .................. 49-109856

[51] Int. Cl.² ............... F01B 3/00; F04B 1/12; F04B 27/08
[52] U.S. Cl. ...................... 92/71; 417/269; 308/3 C; 308/DIG. 8
[58] Field of Search ............ 92/71, 70; 417/269; 308/3 C, DIG. 8, DIG. 9

[56] References Cited

U.S. PATENT DOCUMENTS

| 2,022,917 | 12/1935 | Larkin et al. ............... 308/3 C |
| 2,277,496 | 3/1942 | Maines ......................... 308/3 C |
| 3,057,545 | 10/1962 | Ransom et al. ............... 417/269 |
| 3,709,107 | 1/1973 | Alger et al. ................ 91/499 X |
| 3,720,507 | 3/1973 | Lundin ..................... 308/DIG. 8 |

FOREIGN PATENT DOCUMENTS 288,947 4/1928 United Kingdom .......... 308/DIG. 8

OTHER PUBLICATIONS

Product Engineering, July, 1930, "Bearing Bronzes" pp. 349, 350.
Product Engineering, June, 1942, Bearing Alloys, p. 325.

Primary Examiner—Irwin C. Cohen
Attorney, Agent, or Firm—Browdy and Neimark

[57] ABSTRACT

A vehicle air conditioning compressor which is driven by e.g., the prime mover of the vehicle as required to cool the passenger compartment comprises a swash plate mounted on a rotatable shaft and a plurality of pistons, each being reciprocated by the rotating swash plate via a set of a ball and a shoe rotatably engaging with each other, wherein said compressor is provided for each piston with a shoe composed of a steel backing plate having a sintered porous layer integrally formed thereon of a powdered copper alloy comprising 2.5 – 12.1 wt.% Sn, 7.0 – 25.0 wt.% Pb and the balance being substantially copper, in a critical thickness ranging from 0.1 mm to 0.5 mm.

3 Claims, 4 Drawing Figures

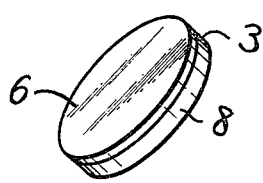
FIG.1
FIG.2
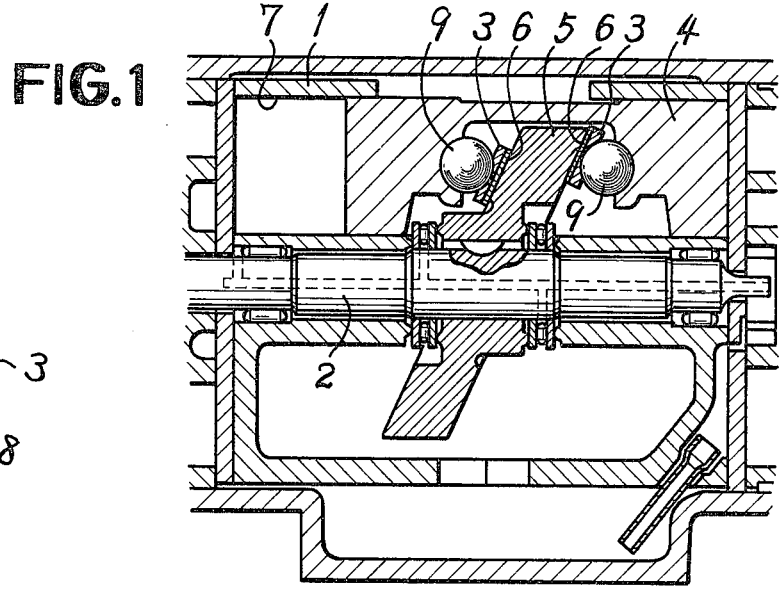
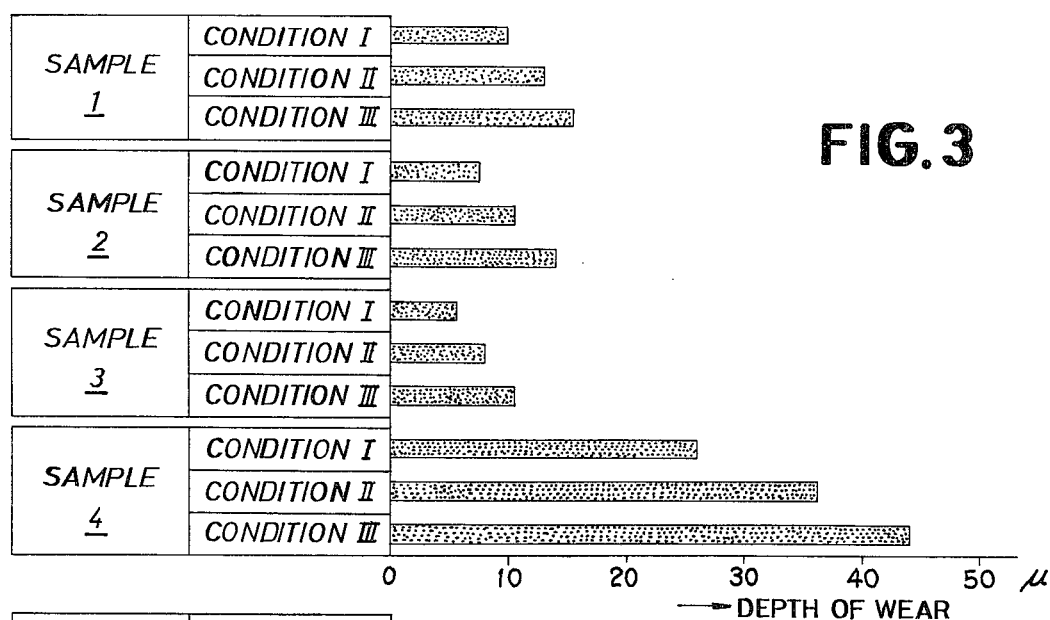
FIG.3
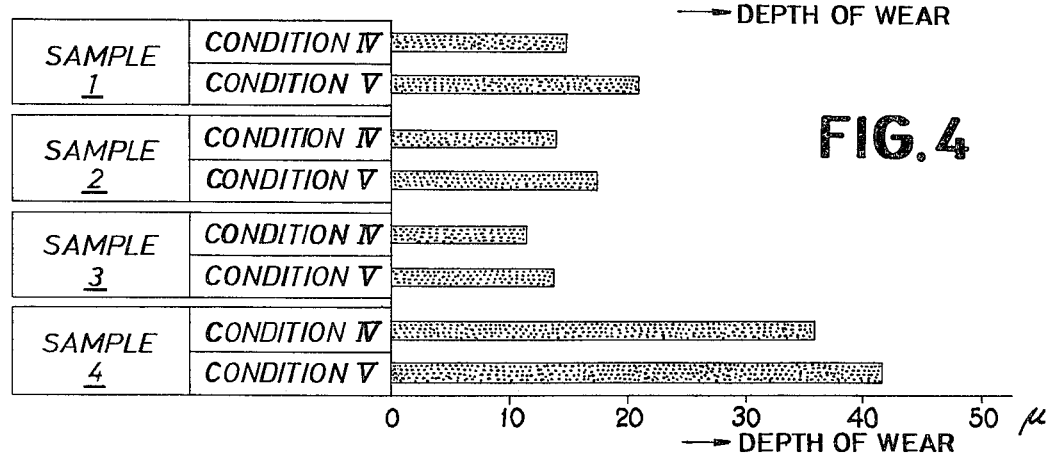
FIG.4

VEHICLE AIR CONDITIONING COMPRESSOR

BACKGROUND OF THE INVENTION

This invention relates to a vehicle air conditioning compressor having a swash plate to drive a plurality of pistons, each via a ball and a shoe arrangement. Such compressor have suffered in the past from a serious problem of lubrication, which is reflected in a large number of related patents and patent applications such as U.S. Pat. No. 3,759,058 dated Sept. 18, 1973 Nowadays the means of lubrication in such compressors is not necessarily a forced system ( with a pump, etc.) but a system where the lubricant mixed with the cooling medium (e.g., Freon gas) is sprayed and brought to the spot necessitating lubrication by means of the centrifugal force, change in direction or speed of the medium gas flow, etc., effective for separating oil particles from conveying gas, however, there are not a few reasons to make the lubrication difficult.

Conventional shoes widely used in vehicle air conditioning compressors are made of Al-Si alloy casting which, for example, comprises Si 20 wt%, small amounts of Mn and Cu and the balance Al, or made of drawn rods of a Cu alloy which, for example, comprises Al 10 wt%, Fe 3.5 wt%, and impurities of less than 0.5 wt%.

Coventional shoes set forth above have been considered to be insufficient in abrasion resistance or shock resistance, because of a long term continuous operation (e.g, for 1200 hrs.) under a condition of oil shortage or difficult lubrication which results mainly from plane-to-plane contact between the shoe and the swash plate.

Therefore, it has been necessary frequently to exchange worn or broken shoes with new ones because of severe frictional wear or breakage due to impact, since the shoe is usually operated under a maximum pressure of about 90 kg/cm$^2$ and a maximum sliding speed of about 23 m/sec. Reciprocating motion of the positon is accompanied by a repeated impact load due to pressure alternating from max. 90 kg/cm$^2$ min. 9 kg/cm$^2$ at a rate of 50 cycles per second, when the rotating shaft is running at 3000 r.p.m., and the plane-to-plane contact between a swash plate and a shoe is generally accompanied by a condition making it hard to lubricate.

SUMMARY OF THE INVENTION

It is a primary object of the present invention to provide an improved vehicle air conditioning compressor comprising a swash plate and improved shoes slidably engaged thereon which are free from the defects of the prior art and excellent in load bearing, high speed sliding, impact- and wear-resistng properties.

It is another object of the present invention to provide an improved swash plate type, vehicle air conditioning compressor having improved shoes, each of which comprises a steel backing plate and a thin porous layer integrally and inseparably sintered thereon from powders of a copper alloy containing Sn in a range from 2.5 to 12.1 wt%, Pb in a range from 7.0 to 25.0 wt% and the balance Cu and inevitable impurities.

BRIEF DESCRIPTION OF THE DRAWING

FIG. 1 is a cross sectional view illustrating a main part of a vehicle air conditioning compressor of the present invention.

FIG. 2 is a perspective view illustrating a shoe according to this invention.

FIG. 3 and 4 are graphical representations of frictional wear on shoes according to the present invention in comparison with that on those of conventional construction.

DETAILED DESCRIPTION OF THE INVENTION

Now, a preferred embodiment of the present invention will be described hereunder in conjection with the drawing.

FIG. 1 shows a main part of a swash plate type vehicle air conditioning compressor having a cylinder block 1 one being visible in FIG. 1, which is provided with three cylinder bores 7 one being visible in FIG. 1, disposed longitudinally in parallel with 120 ° phase difference and three pistons 4, each reciprocably movable in each respective cylinder bore of the common cylinder block 1, only one pistons being visible in FIG. 1.

Each piston 4 is engaged with a swash plate 5 via balls 9 and shoes 3 slidably to reciprocate in the cylinder bores 7 according to the rotation of the swash plate 5 driven by a rotating shaft 2 which is also driven in a conventional way by an engine or a prime mover of a vehicle (not shown).

Each of the shoes 3 are composed of an imperforated backing plate 8 of steel and a continuous, imperforated sintered layer 6 formed on the back side of the backing plate 8 to make a slidable contact with the swash plate 5. The sintered layer 6 is made from powders of a copper alloy which consists of 2.5 - 12.1 wt% of tin, 7.0 - 25.0 wt% of lead and the balance being substantially copper and inevitable impurities.

The copper alloy preferably consists of 3.5 to 4.0 percent tin by weight, 23.0 to 25.0 percent lead by weight, with the balance being substantially copper and impurities.

Now, the composition of the copper alloy will be described more in detail. Such a copper alloy as specified above when used as a compressor shoe has been found not to provide sufficient strength when it contains less than 2.5 wt% of tin, when an alloy is made from such a mixture with copper; when it contains more than 12.1 wt% of tin, it has been found to become too hard and brittle, due to formation of $\beta$ phase. This is the reason why the range of tin content is limited from 2.5 to 12.1 wt% in the present invention. As regards the content of lead, it has been found that a sintered copper alloy containing less than 7.0 wt% of lead shows unsatisfactory lubrication and another copper alloy containing more than 25 wt% of lead is brittle; therefore, the range of 7.0 to 25.0 wt% of lead is preferable. The presence of impurities in a quantity of up to about 5 wt% has been found to give no significant influence on the properties of the shoes according to the present invention.

Now, explanation will be given hereunder about some test data obtained on shoes according to the present invention in comparison with conventional ones. Powdered metal alloys of the chemical compositions as shown in Table 1 as samples 1 to 3 were sintered on each back side of the backing steel plates 8 at 780° C in a reducing atmosphere for about 20 minutes to obtain shoe pieces 3 with a porous sintered layer in a thickness of 0.1 to 0.5 mm, inseparably or integrally formed on the backing steel plate, but more preferable thickness is between 0.3 mm and 0.5 mm.

As a comparative material, some sample shoes were cast of an aluminum-silicon alloy, a conventional material for such a purpose which consists of 20 wt% of silicon and less than 4 wt% of manganese and copper as impurities, the balance being aluminum, and is designated by the sample number 4 in Table 1.

Table 1

| No. of Sample | (in wt%) Composition | | | |
|---|---|---|---|---|
| 1 | Sn 4 | Pb 8 | Cu balance | Impurities < 2 |
| 2 | Sn 10 | Pb 10 | Cu balance | Impurities < 2 |
| 3 | Sn 3.5 | Pb 23 | Cu balance | — |
| 4 | Si 20 | — | Al balance | Impurities < 4 |

As already mentioned above, the samples 1 to 3 in Table 1 above are shoes according to the present invention, and the sample 4 is a shoe of a conventional material. Shoes 3 made of these materials were subjected to running experiments on an actual compressor. The mating part, swash plate 5, was made of nodular graphite cast iron, and high frequency hardended. The size of the shoes was determined to be 18 mm in the diameter. The conditions of said experiments are shown in the Table 2.

Table 2

|  | Condition I | Condition II | Condition III |
|---|---|---|---|
| Sliding speed max. m/sec | 22.5 | 19.0 | 22.5 |
| Load max. kg/cm$^2$ | 53.5 | 71.6 | 88.9 |
| Load min. kg/cm$^2$ | 7.1 | 8.9 | 9.0 |
| Duration of Sliding (h) | 300 | 400 | 500 |

In Table 2, under item of Duration of Sliding in the case of Condition II only, it is to be noted that the duration of 400 hours in summation of each of reiterated running for 25 secs. and a stop interval for 5 secs. after every 25 sec running (i.e., 25 sec running + 5 sec stop + 25 sec running + 5 sec stop ----). The results of the experiments are shown in FIG. 3, from which it is easily understood that the shoes 3 (sample numbers 1 – 3 formed with the sintered layer of the compositions according to the present invention show far less abrasion than the comparative sample No. 4. Among others, sample No. 3 is particularly excellent. Further experiments were carried out on shoes prepared of these four kinds of samples under two different conditions, i.e., Conditions IV and V. The Condition IV designates a running experiment for 1200 hours comprising a series of said Conditon II, Condition III and Condition I in turn (i.e., 1200 hrs= 400 + 500 + 300), and the Condition V designates a running experiment for 1100 hours comprising Condition III followed by twice Condition I (i.e., 1100 hrs = 500 + 300 + 300). The results of these exmperiments are shown in FIG. 4, from which the superiority of the shoes according to the present invention in both conditions IV and V is proved in comparison with those made of sample 4 made of the conventional material.

The success of the present invention may be attributed to the folowing reasons.

The strength of bonding between the backing steel plate and the sintered layer, namely at the fusion surface, was examined and found to be as high as 20 kg/cm$^2$ (shearing stress) which means that the bonding strength considerably high due to the fact that the alloy particles just fuse on the surface and establish a good bonding surface to the steel backing plate in the properly selected conditions as set forth.

Secondary, the thickness of porous sintered layer is properly selected; thicker ones tend to break by impact and thinner ones tend to deteriorate bearing properties. The suitable thickness range is from 0.1 mm to 0.5 mm and the more preferable range is from 0.3 mm to 0.5 mm.

Thirdly, the shoe is considered to undergo a cyclic deformation thereof, i.e., so-to-say "breathing motion" which favors lubrication, however, adversely affects to the duration life of the shoe. The binary construction of the present invention, whose major part is made of steel is considered to assure the long life which was proved irrespective of breathing action.

In short, the present invention improves a swash plate type vehicle air conditioning compressor in load bearing, high speed sliding, impact- and wear-resisting properties by adopting the specific shoe described above, resulting in a longer life thereof and maintenance free operation of the compressor.

Further, the present invention has solved the problems of significant frictional wear under conditions of high speed operation and of fracture due to seizure or impact load.

It wil be obvious to those skilled in the art that various changes may be made without departing from the scope of the invention and the invention is not to be considered limited to what is shown in the drawings and described in the specification.

What is claimed is:

1. In a vehicle air conditioning compressor having a swash plate mounted on a rotatable shaft and a plurality of pistons, each of which is slidably engaged with the swash plate through intermediary of a set of a ball means and a shoe plate through the intermediary of a set of a ball means and a shoe means rotatably engaging with one another and slidably reciprocates inside a cylinder bore of a common cylinder block in accordance with rotation of the swash plate, an improvement wherein:
    each said shoe comprises an imperforate ferrous backing plate as a major part thereof and a continuous, imperforate, sintered porous layer of a copper alloy, which is relatively thin with respect to said major part, formed integrally on said backing plate in slidable contact with said swash plate, said sintered layer having thickness in the range of from 0.3 mm to 0.5 mm and consisting essentially of tin in a range of from 2.5 to 12.1 percent by weight and lead in a range of from 7.0 to 25.0 percent by weight with the balance by weight being copper.

2. An improved vehicle air conditioning compressor in accordance with claim 1, wherein said ferrous backing plate is made from cast iron.

3. An improved vehicle air conditioning compressor in accordance with claim 2, wherein said layer of said copper alloy contains tin in a range of from 3.5 to 4.0 percent by weight and lead in a range of from 23.0 to 25.0 percent by weight.

* * * * *